(12) United States Patent
Archibald

(10) Patent No.: US 6,479,085 B1
(45) Date of Patent: Nov. 12, 2002

(54) EFFERVESCENT CANDY BAR

(75) Inventor: Henry Shire Archibald, UxBridge (CA)

(73) Assignee: Nestec S.A., Vevey (CH)

( * ) Notice: Subject to any disclaimer, the term of this patent is extended or adjusted under 35 U.S.C. 154(b) by 204 days.

(21) Appl. No.: 09/602,074

(22) Filed: Jun. 23, 2000

Related U.S. Application Data

(60) Provisional application No. 60/212,378, filed on Jun. 19, 2000.

(51) Int. Cl.⁷ .................................................. A23G 3/00
(52) U.S. Cl. ........................ 426/103; 426/533; 426/561; 426/660
(58) Field of Search .................................. 426/660, 533, 426/103, 561

(56) References Cited

U.S. PATENT DOCUMENTS

| | | | | |
|---|---|---|---|---|
| 3,012,893 A | * | 12/1961 | Kremzner et al. ........... | 426/660 |
| 3,623,889 A | | 11/1971 | Falconer et al. .............. | 99/134 |
| 4,001,457 A | * | 1/1977 | Hegadorn .................... | 426/572 |
| 4,140,804 A | | 2/1979 | Seymour ..................... | 426/94 |
| 4,289,790 A | | 9/1981 | Bruelle ........................ | 426/93 |
| 4,317,839 A | * | 3/1982 | Mitchell et al. ............... | 426/96 |
| 5,624,700 A | | 4/1997 | Ogden ........................ | 426/564 |
| 5,728,419 A | | 3/1998 | Caron et al. ................. | 426/565 |
| 5,985,341 A | | 11/1999 | Ahlschwede ................. | 426/93 |
| 6,071,539 A | * | 6/2000 | Robinson et al. ........... | 426/446 |

FOREIGN PATENT DOCUMENTS

| | | |
|---|---|---|
| EP | 0 437 927 | 7/1991 |
| EP | 0 674 841 | 10/1995 |
| ES | 2 019 151 | 6/1991 |
| FR | 1003636 | 3/1952 |
| GB | 1215449 | 12/1970 |
| JP | 1-243946 | 9/1998 |
| WO | WO 96/18310 | 6/1996 |
| WO | WO 97/19602 | 7/1997 |
| WO | WO 98/03077 | 1/1998 |
| WO | WO 98/26668 | 6/1998 |

* cited by examiner

*Primary Examiner*—Nina Bhat
(74) *Attorney, Agent, or Firm*—Winston & Strawn

(57) ABSTRACT

An effervescent candy bar of a syrup-based malleable and chewable component comprising at least two masses at least one of which contains acid and at least one contains alkali and a method for its preparation or manufacture.

14 Claims, No Drawings

EFFERVESCENT CANDY BAR

This application claims benefit under 35 U.S.C. 119 (e) of Provisional Application 60/212,378 filed Jun. 19, 2000.

FIELD OF THE INVENTION

The present invention relates to an effervescent candy bar and more particularly to an effervescent chewable candy bar.

BACKGROUND OF THE INVENTION

There are a number of effervescent products on the market and reported in the literature, e.g., chewing gum, spoonable food, cakes, fat-based products such as chocolate, frozen products such as ice cream, effervescent powder trapped inside a high-boiled candy, effervescent powder plus lollipop format, or pressed tablets which effervesce when eaten such as "Trebor Refreshers" sold by Cadbury in the United Kingdom. The effervescence is usually caused by the use of an acid and alkali which react in the mouth when the product is consumed.

No syrup based effervescent candy bars are known, however, because there is a problem of premature reaction, of the acid and alkali due to the presence of moisture.

We have found that an effervescent effect may be achieved in a malleable, chewy type of syrup-based product although it would normally be expected that if the acid and alkali was mixed into the warm mass during processing then the acid and alkaline components would prematurely react during the mixing and layering process. The present invention overcomes this problem and satisfied a need for such products.

SUMMARY OF THE INVENTION

According to the present invention there is provided an effervescent candy bar of a syrup-based malleable and chewable component comprising at least two masses at least one of which contains acid and at least one contains alkali. Surprisingly, we have found that by utilizing a two separate mass type technique these components do not prematurely react to any significant effect. In addition, at lower moisture contents, there is usually no need for an insulating layer between the acidic and the alkaline masses or layers.

DETAILED DESCRIPTION OF THE INVENTION

The syrup-based malleable and chewable component may be, for instance, marshmallow, fudge, nougat, marzipan, fruit chew, fruit paste, caramel, chewy gelled/gummy masses, etc. This component may, if desired, be mixed with edible solid pieces such as cereal pieces, e.g., wheat crispies, puffed wheat, or crisped rice; candy pieces; fruit pieces; legume pieces, e.g., chickpea; or chopped nuts, etc.

In one example of a candy bar, one of the masses containing either the acid or alkali may be the syrup-based malleable and chewable component while the other mass is in the form of one or more pellets or compressed powder within the candy bar. In another example of a candy bar, the syrup-based malleable and chewable component may be substantially neutral while the masses comprise two or more pellets or compressed powders distributed within the syrup-based malleable and chewable component.

Preferably, the masses are formed by layers of the syrup-based malleable and chewable component, at least one layer containing acid and at least one layer containing alkali.

Differing layer thicknesses are also possible as long as the total ratio of acid to alkali is maintained. This could be achieved by having a thicker, lower acid concentration acidic layer combined with a thinner layer with a higher than normal percentage of alkali.

In one preferred example, the adjacent layers are made of a mixture of the syrup-based malleable and chewable component and edible solid pieces, advantageously in which the edible solid pieces are substantially evenly coated with the syrup-based malleable and chewable component.

The acidic layer may be up to 50 times more acidic than normal and the alkaline layer may be up to 50 times more alkaline than normal. Preferably, the acidic layer is from about 10 to 30 times more acidic than normal and the alkaline layer is from about 10 to 30 times more alkaline than normal. The acid and alkali should be edible and food-acceptable. The acid may comprise one or more of citric, malic, lactic, tartaric, phosphoric acid. The alkali may be conveniently be sodium bicarbonate or potassium bicarbonate. The amount of acid used in the acid portion may be from about 3 to 20% and preferably from 10 to 15% by weight based on the weight of the acid portion. The amount of alkali used in the alkali portion may be from about 3 to 20% and preferably from 10 to 15% by weight based on the weight of the alkali portion.

In a candy product of this invention, the masses may have different colors. In a layered product, the adjacent layers of the candy bar may be made of the same or different materials. The adjacent layers of the candy bar may advantageously be of different colors. There may be more than two layers, e.g., from 3 to 6 layers or more, the number of layers of layers only being limited by practical considerations.

The moisture content of the candy bar may vary from about 7% to 30% by weight based on the weight of the bar. In a layered product, when the moisture content of the candy bar is greater than an amount which causes interaction between the layers with respect to premature effervescence, advantageously there is an insulating layer of fat-based material between adjacent layers of the candy bar.

The exact moisture content where no insulative barrier between the layers is needed will vary depending on the formula type involved, the components of the layer, (e.g., when crispies are included the moisture level required to cause a "cold" reaction is higher than when the layer/formula does not contain crispies), as well as how much of the moisture is bound up. Normally, when the center moisture content is around 15% to 17%, interaction between the layers with respect to premature effervescence is not experienced.

Advantageously, the candy bar may be coated on one or more sides with a fat-based material.

The fat-based material used for the insulating layer or for coating the product may be any fat based layer known within the industry as a compound coating type of material. This means any formula which is comprised of fine (under 500 microns as measured by an engineering micrometer) particles suspended in a edible lipid material such as fat. This material can be any color chocolate or compound coating material. The chocolate may be milk, dark or white chocolate. The compound coating material may include chocolate substitutes containing direct cocoa butter replacements, stearines, coconut oil, palm oil, butter or any mixture thereof including confectioner's coatings also known as compound or couvertures, used for covering ice cream or cakes usually comprising chocolate analogues with cocoa butter replaced by a cheaper vegetable fat.

The present invention also provides a method for the production of an effervescent candy bar of a syrup-based malleable and chewable component comprising at least two masses at least one of which contains acid and at least one contains alkali which comprises preparing a syrup-based malleable and chewable base adding acid to at least one of the masses and alkali to at least one of the other masses.

When the candy bar comprises at least two layers of syrup-based malleable and chewable components wherein at least one layer is acidic and an adjacent layer is alkaline the method of production comprises preparing a syrup-based malleable and chewable base, forming into layers of the desired thickness, width and length, adding acid and alkali respectively to adjacent layers and sequentially forming the layers one on top of the other.

When the syrup-based malleable and chewable base is combined with edible solid pieces, the syrup-based malleable and chewable base may be combined with the edible solid pieces in a ribbon blender, or similar continuous mixer. These components can also be added and mixed in batch type mixers such as mixing kettles, Hobart planetary mixers and the like.

Each layer may prepared simultaneously but in separate streams and first one complete layer mass is sheeted to the required thickness by any available suitable means such as but not limited to a Hutt extruder and typically at about 38° to 66° C. (100 to 150° F.) on to a moving endless belt. This mass is typically, although not always necessary, cooled until of a firm texture and the second layer is likewise sheeted on top of the first layer. The two layers are cooled to such a temperature that the firmness is adequate for the mass to typically but not exclusively be slit by rotary knives into strips. These strips are then cross cut by a guillotine blade to the required length.

The bars can be wrapped in this format but are more typically partly or fully enrobed in a fat based coating such a chocolate or what is known in the trade as compound coating. Bars may be then typically wrapped and packed at 20 to 60 in a box for distribution.

When the syrup-based malleable and chewable base is marshmallow, there may be added minor ingredients such as vegetable fat, typically in an amount of about 8 to 16% by weight (of the complete layer) and preferably 11 to 13% by weight to reduce stickiness at cutting and when eaten, emulsifiers in an amount of about 0.01 to 2% by weight (of the complete layer) and typically 0.1 to 0.5% by weight, glycerine to retain moisture in an amount of about 0.2 to 7% by weight and typically at 1 to 3% by weight, and suitable flavoring materials such as vanilla used in conventional quantities.

When the product is eaten, approximately equal quantities of acidic and alkali layers are bitten off and masticated with saliva in the mouth. The higher moisture level caused by the admixing of saliva with the product causes sufficient moisture to be present to activate a reaction between the acidic layer and the alkaline layer such that $CO_2$ gas is given off together with a slightly overall acidic taste plus a prickly, tingling mouthfeel associated with the effervescence.

EXAMPLES

The following Examples further illustrate the present invention.

Example 1

A marshmallow base is prepared by a standard method from heated, dissolved gelatin and water, mixed with a cooked syrup of sugar, glucose syrup, fructose and sorbitol. This has air whipped into it to an initial density of around 0.4, to form a base marshmallow.

To the marshmallow base is added, based on the weight of a complete layer, 12% by weight of vegetable fat, 0.25% by weight of lecithin, 2.0% by weight of glycerine, and 0.1% by weight of vanilla flavor.

This is mixed at slow speed until evenly distributed throughout the mass. This distribution has the purpose of ensuring that the chewy mass does not overly stick on the teeth when chewed.

To this combined mixture is added 32% by weight of crisped wheat in the form of small spheres (i.e., 2–3 mm diameter) in a ribbon blender with mixing applied until all the crispies are evenly coated with the marshmallow.

Two layers are prepared simultaneously but in separate streams and first one complete layer mass is sheeted to the required thickness using a Hutt extruder at 50° C. (122° F.) on to a moving endless belt into a sheet 20–25 mm thick. This mass is cooled to 20° C. (68° F.) until of a firm texture and the second layer is likewise sheeted on top of the first layer. The two layers are cooled to such a temperature that the firmness is adequate for the mass to be slit by rotary knives into strips. These strips are then cross cut by a guillotine blade into 25 mm wide strips before being cross cut (guillotined) to the desired length. The moisture content is 10% by weight based on the weight of the layers.

The product uses two equally thick layers of the same base material comprised of different colors. One layer has mixed through it 10% by weight of fine citric acid powder. The other layer has mixed through it 10% of fine sodium bicarbonate powder. These layers are placed one on top of the other and are formed sequentially first one and then the other directly on top of each other. The base of this combined layer is then covered by a colored compound coating (or colored white chocolate) material to a depth of about 5 mm.

It was found that no insulating layer of chocolate-like material was needed and the two layers did not react with each other on storage.

When the product is eaten, the consumer perceives a slightly overall acidic taste plus a prickly, tingling mouthfeel associated with the effervescence. Example 2

A similar procedure to that described in Example 1 was followed except that the moisture content of the mixture of marshmallow and crisped wheat is 20%.

In this case, a layer of compound coating 2.5 mm thick is placed between the two layers to stop any premature reaction between the two layers.

When the product is eaten, the consumer perceives a slightly overall acidic taste plus a prickly, tingling mouthfeel associated with the effervescence.

What is claimed is:

1. An effervescent candy bar comprising at lease two layers of syrup-based malleable and chewable components and including at least two masses at least one of which contains acid and at least one contains alkali.

2. An effervescent candy bar according to claim 1 wherein one layer is acidic and the adjacent layer is alkaline.

3. An effervescent candy bar according to claim 2 wherein the adjacent layers are made of a mixture of the syrup-based malleable and chewable component and edible solid pieces, in which the edible solid pieces are substantially evenly coated with the syrup-based malleable and chewable component.

4. An effervescent candy bar according to claim 2 wherein when the moisture content of the candy bar is greater than an amount which causes interaction between the layers with respect to premature effervescence, there is an insulating layer of fat-based material between adjacent layers of the candy bar.

5. An effervescent candy bar according to claim 4 wherein the moisture content of the candy bar is greater than about 15% by weight based on the weight of the bar.

6. An effervescent candy bar according to claim 4 wherein the fat-based material is chocolate or compound coating material.

7. An effervescent candy bar according to claim 2 wherein the adjacent layers are of different colors.

8. An effervescent candy bar according to claim 2 wherein the adjacent layers includes components of the same or different materials.

9. An effervescent candy bar according to claim 1 wherein the syrup-based malleable and chewable component is marshmallow, fudge, nougat, marzipan, fruit chews, fruit pastes, caramel, chewy or gelled gummy masses.

10. An effervescent candy bar according to claim 1 wherein the syrup-based malleable and chewable component contains cereal pieces, candy pieces, dried fruit, dried legumes or chopped nuts.

11. An effervescent candy bar according to claim 1 wherein the amount of acid used in the acid mass is from about 3 to 20% by weight based on the weight of the acid mass and the amount of alkali used in the alkali mass is from about 3 to 20% by weight based on the weight of the alkali mass.

12. An effervescent candy bar according to claim 1 wherein the moisture content of the candy bar is from about 7 to 30% by weight based on the weight of the bar.

13. A method for the production of an effervescent candy bar comprising of at lease two layers of syrup-based malleable and chewable components which includes at least two masses at least one of which contains acid and at least one contains alkali which comprises preparing a syrup-based malleable and chewable base and adding acid to at least one of the masses and adding alkali to at least one of the other masses.

14. A method according to claim 13 wherein at least one layer is acidic and an adjacent layer is alkaline, which comprises preparing a syrup-based malleable and chewable base, forming into layers of the desired thickness, width and length, adding acid and alkali respectively to adjacent layers and sequentially forming the layers one on top of the other.

* * * * *

UNITED STATES PATENT AND TRADEMARK OFFICE
CERTIFICATE OF CORRECTION

PATENT NO.     : 6,479,085 B1
DATED          : November 12, 2002
INVENTOR(S)    : Archibald It is certified that error appears in the above-identified patent and that said Letters Patent is hereby corrected as shown below:

Column 4,
Line 54, change "lease" to -- least --.

Column 6,
Line 9, change "comprising of at lease" to -- comprising at least --.

Signed and Sealed this

Fourth Day of March, 2003

JAMES E. ROGAN
*Director of the United States Patent and Trademark Office*